US010810300B2

(12) United States Patent  
Greenberger et al.

(10) Patent No.: US 10,810,300 B2  
(45) Date of Patent: Oct. 20, 2020

(54) USER AUTHENTICATION EMPLOYING USER ACTIVITY BASED INQUIRIES

(71) Applicant: International Business Machines Corporation, Armonk, NY (US)

(72) Inventors: Jeremy A. Greenberger, San Jose, CA (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/150,611

(22) Filed: Oct. 3, 2018

(65) Prior Publication Data

US 2020/0110866 A1 Apr. 9, 2020

(51) Int. Cl.
*G06F 21/36* (2013.01)
*G06F 21/31* (2013.01)
(Continued)

(52) U.S. Cl.
CPC ............ *G06F 21/36* (2013.01); *G06F 21/316* (2013.01); *G06Q 30/0255* (2013.01);
(Continued)

(58) Field of Classification Search
CPC .................. G06F 21/36; G06F 21/316; G06F 2221/2103; G06F 2221/2133; G06F 21/31;
(Continued)

(56) References Cited

U.S. PATENT DOCUMENTS 8,374,588 B2 * 2/2013 Hurst ...................... G06Q 30/02
455/414.1
8,468,090 B2 6/2013 Lesandro et al.
(Continued)

FOREIGN PATENT DOCUMENTS

WO 2016190650 A1 12/2016

OTHER PUBLICATIONS

Joy et al., "Secure Net Banking: Providing Security Aganist Online Password Guessing Attacks." International Journal of Emerging Trends in Engineering and Development Issue 4, vol. 2 (Mar. 2014), pp. 843-854.
(Continued)

*Primary Examiner* — Jayesh M Jhaveri
(74) *Attorney, Agent, or Firm* — Diana Roberts Gerhardt; Edell, Shapiro & Finnan, LLC (57) ABSTRACT

According to one embodiment of the present invention, a system includes at least one processor and authenticates a user. The system monitors interactions on a network site and identifies an interaction requiring user authentication. An inquiry is generated to authenticate the user based on an activity history for the user. A plurality of candidate responses are determined for the inquiry, where at least one candidate response for the inquiry includes information for an item associated with the activity history for the user. The inquiry is presented to the user, and user selection of one or more of the candidate responses is enabled as a reply to the inquiry. The identified interaction is performed in response to verification of the reply to the inquiry authenticating the user. Embodiments of the present invention further include a method and computer program product for authenticating a user in substantially the same manner described above.

20 Claims, 3 Drawing Sheets

(51) Int. Cl.
  *H04L 29/08* (2006.01)
  *G06Q 30/02* (2012.01)
  *G06N 20/00* (2019.01)
(52) U.S. Cl.
  CPC ...... *H04L 67/22* (2013.01); *G06F 2221/2103* (2013.01); *G06F 2221/2133* (2013.01); *G06N 20/00* (2019.01)
(58) Field of Classification Search
  CPC .... G06N 20/00; G06Q 30/0255; G06Q 30/02; H04L 67/22; H04L 29/08
  See application file for complete search history.

(56) References Cited

U.S. PATENT DOCUMENTS

| | | | |
|---|---|---|---|
| 8,732,089 B1 | 5/2014 | Fang et al. | |
| 8,832,798 B2* | 9/2014 | Thavasi | G06F 21/32 726/4 |
| 8,910,251 B2 | 12/2014 | Shepard et al. | |
| 8,955,066 B1* | 2/2015 | Ackerman | G06F 21/316 726/5 |
| 9,679,124 B2 | 6/2017 | Malone | |
| 9,760,910 B1* | 9/2017 | Tuchman | G06Q 50/01 |
| 9,898,750 B2 | 2/2018 | Compton et al. | |
| 2008/0263460 A1 | 10/2008 | Altberg et al. | |
| 2012/0254940 A1* | 10/2012 | Raper | G06Q 20/4014 726/3 |
| 2013/0226698 A1* | 8/2013 | Cochinwala | G06Q 30/02 705/14.53 |
| 2015/0317700 A1* | 11/2015 | Ford | G06Q 30/0277 705/71 |
| 2016/0261898 A1 | 9/2016 | Gary | |
| 2017/0109509 A1* | 4/2017 | Baghdasaryan | G06Q 20/40 |
| 2018/0004921 A1 | 1/2018 | McInerny et al. | |
| 2018/0048634 A1* | 2/2018 | Fang | G06Q 20/389 |
| 2019/0114404 A1* | 4/2019 | Nowak | H04W 12/0027 |

OTHER PUBLICATIONS

Sheikh et al., "Internet Banking, Security Models and Weakness." International Journal of Research in Management & vol. 2 Issue 4 Oct.-Dec. 2015 Business Studies (IJRMBS 2015), pp. 17-22.

* cited by examiner

USER AUTHENTICATION EMPLOYING USER ACTIVITY BASED INQUIRIES

BACKGROUND

1. Technical Field

Present invention embodiments relate to computerized security systems, and more specifically, to controlling computerized access or performance of a computerized interaction by authenticating a user with user activity based inquiries.

2. Discussion of the Related Art

A number of multi-factor authentication mechanisms may be employed by computer systems to verify an identity of a user. These mechanisms may utilize various types of approaches to verify the user identity, such as username/password, text messages/email, pre-defined questions and answers, etc. In addition, security techniques employed by computer systems, such as CAPTCHA, determine whether a human or software (e.g., a bot, etc.) is accessing a web site. However, these mechanisms and techniques may provide limited verification of the user identity, especially when the requested user information may be easily ascertained by an unauthorized entity.

SUMMARY

According to one embodiment of the present invention, a system includes at least one processor and authenticates a user. The system monitors interactions on a network site and identifies an interaction requiring user authentication. An inquiry is generated to authenticate the user based on an activity history for the user. A plurality of candidate responses are determined for the inquiry, where at least one candidate response for the inquiry includes information for an item associated with the activity history for the user. The inquiry is presented to the user, and user selection of one or more of the candidate responses is enabled as a reply to the inquiry. The identified interaction is performed in response to verification of the reply to the inquiry authenticating the user. Embodiments of the present invention further include a method and computer program product for authenticating a user in substantially the same manner described above.

BRIEF DESCRIPTION OF THE DRAWINGS

Generally, like reference numerals in the various figures are utilized to designate like components.

DETAILED DESCRIPTION

A number of conventional multi-factor authentication mechanisms may be employed by computer systems to verify an identity of a user. These mechanisms may utilize various types of approaches to verify the user identity, such as username/password, text messages/email, pre-defined questions and answers, etc. However, these approaches either provide the same question, or provide a different ordering of questions each having the same or static corresponding answer. Accordingly, these approaches may be susceptible when information for the answers are easily obtainable by unauthorized users (e.g., publicly available information, etc.). Further, the questions of these approaches are generally limited to only the security task, and forego opportunities to disseminate other information pertaining to user interests.

Present invention embodiments provide a mechanism of personalized security that utilizes a user activity history (e.g., purchase and/or browsing history, etc.) for increased security. This information is typically confined to knowledge of the user, and may provide enhanced security. Further, the inquiries may be dynamically generated and updated based on subsequent activity of the user. For example, machine learning may be employed to dynamically generate the inquiries or questions based on the activity history. Accordingly, the inquiries and corresponding answers are dynamically altered as the activity history changes over time.

In addition, inquiries utilized by the personalized security mechanism of a present invention embodiment include advertisements that provide up-sell and/or cross-sell opportunities for products or other items (e.g., goods, services, etc.) of merchants or service providers. A present invention embodiment allows advertisers to inject content into a security question or inquiry for various interactions requiring verification of a user (e.g., recovering a username or password to a shopping or other account, general login, payment, resetting a password, etc.). The advertisements may be incorporated into (or serve as) candidate responses for the inquiry selectable by the user to reply to the inquiry. The candidate responses may be dynamically generated and updated based on subsequent activity of the user. For example, machine learning may be employed to dynamically generate the candidate responses based on the particular inquiry and activity history. Accordingly, the corresponding answers for a same inquiry are dynamically altered as the activity history changes over time (e.g., an answer to a request for a most recent product purchase may change with subsequent user activity, etc.). This confines the answers to the specific knowledge of the user, thereby rendering the answers more difficult to ascertain for unauthorized entities.

Since the security inquiries and corresponding answers to those inquiries of present invention embodiments are dynamically generated, confined to specific user knowledge, and vary with user activity, an enhanced level of user authentication is provided by embodiments of the present invention. In addition, the personal security mechanism of a present invention embodiment provides additional information of user interest (e.g., product/service information, advertisements, etc.) during the authentication process to provide opportunities for additional transactions or activities. Present invention embodiments may be utilized as an individual security or authentication mechanism, or be utilized in combination with other authentication mechanisms to provide an additional level of security.

Figure 1:
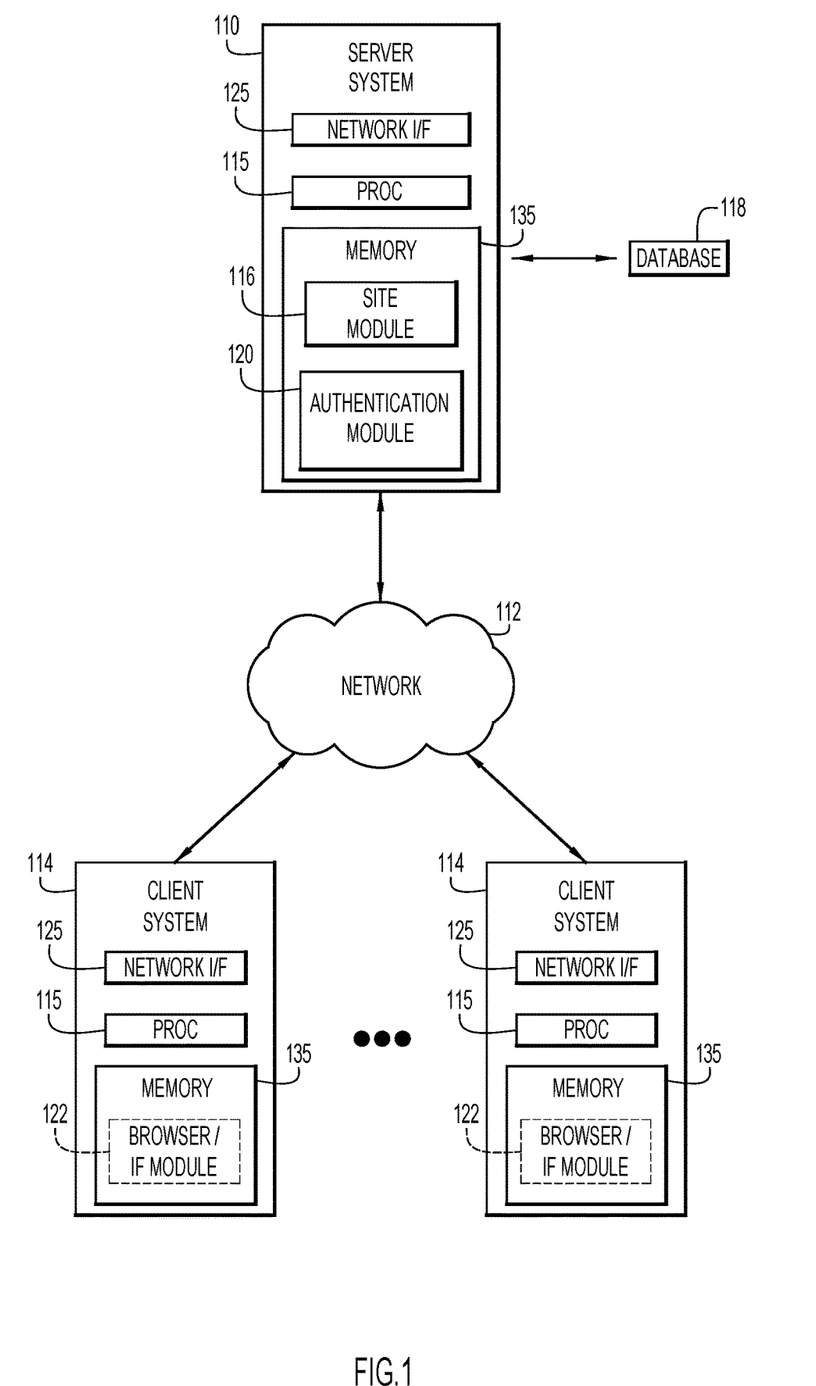
FIG. 1 is an example computing environment of an embodiment of the present invention.

An example computing environment of present invention embodiments is illustrated in FIG. 1. Specifically, computing environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to access a network or web site of server systems 110 to perform various interactions (e.g., conduct purchases, pay bills, or other transactions, banking, access data, review items, share items, add items to a wish list or registry, etc.) via a browser/interface module 122. The server systems include a site module 116 and an authentication module 120. The site module interacts with a user on client system 114 and conducts the various interactions of the network or web site (e.g., conduct purchases, pay bills, or other transactions, banking, access data, review items, share items, add items to a wish list or registry, etc.). The authentication module verifies an identify of the user according to present invention embodiments as described below.

A database system 118 may store various information for authentication (e.g., user information, user purchasing, browsing, or other activity history, item information, advertiser information, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired interactions and other activities, and may provide reports including interaction or activity results (e.g., confirmations, receipts, etc.).

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, site module, authentication module, browser/interface module, etc.). The base preferably includes at least one hardware processor 115 (e.g., microprocessor, controller, central processing unit (CPU), etc.), one or more memories 135, and/or internal or external network interfaces or communications devices 125 (e.g., modem, network cards, etc.)).

The site and authentication modules may include one or more modules or units to perform the various functions of present invention embodiments described below. The various modules (e.g., server/communications software, site module, authentication module, browser/interface module, etc.) may be implemented by any combination of any quantity of software and/or hardware modules or units, and may reside within memory 135 of the server and/or client systems for execution by a corresponding processor 115.

Figure 2:
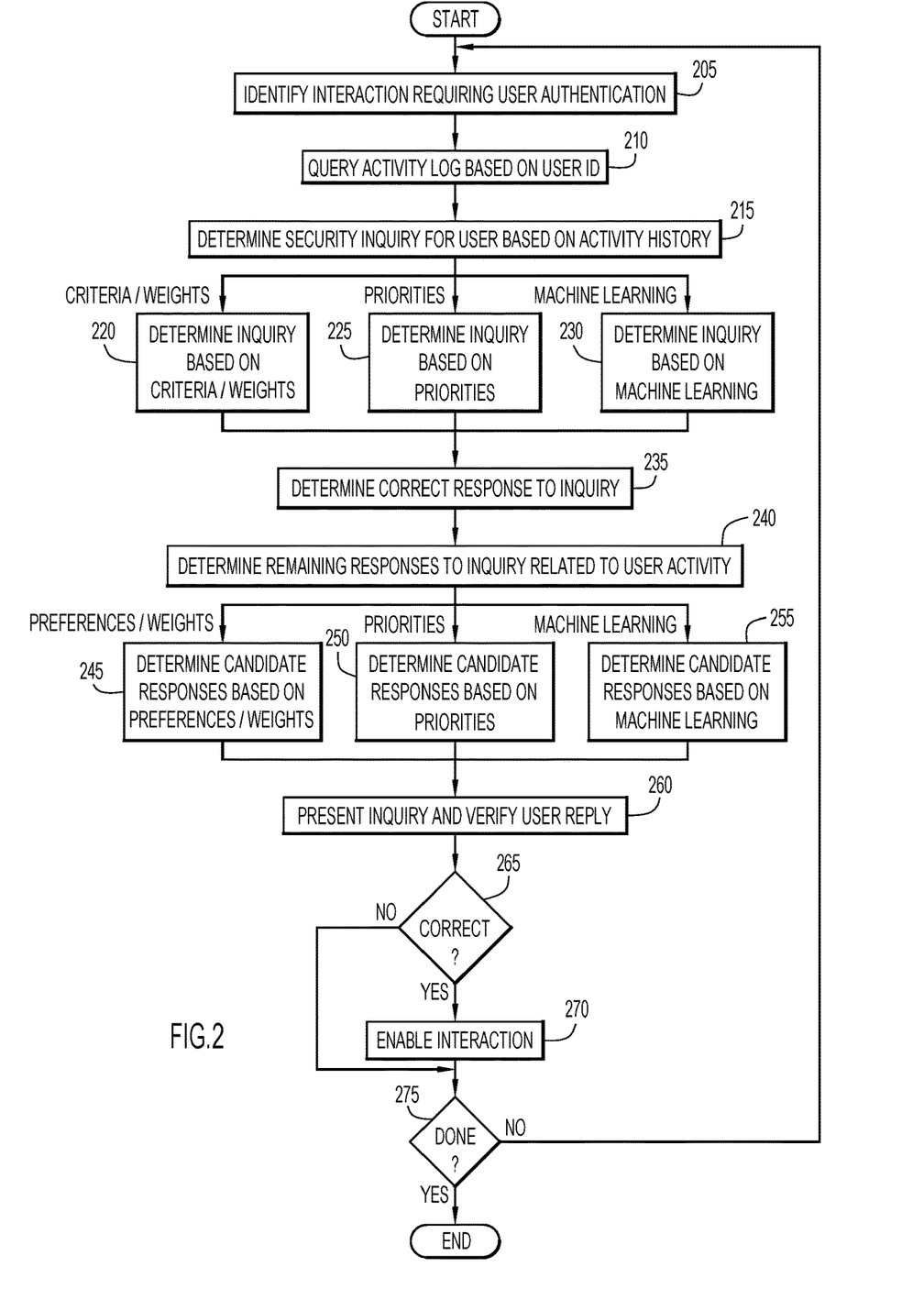
FIG. 2 is a procedural flowchart illustrating a manner of controlling performance of an interaction by authenticating a user with a user activity based inquiry according to an embodiment of the present invention.

A manner of controlling access or performance of an interaction by authenticating a user with user activity based inquiries (e.g., via one or more server systems 110, site module 116, and authentication module 120) according to an embodiment of the present invention is illustrated in FIG. 2. Initially, a user on a client system 114 navigates via browser/interface module 122 to a desired network or web site to perform various interactions (e.g., conduct purchases, pay bills, or other transactions, banking, access data, review items, share items, add items to a wish list or registry, etc.).

Site module 116 interacts with the user on client system 114 and controls performance of requested interactions of the network site.

The site module further records the activities of users to produce an activity log that is stored in database system 118. The activity log may include any desired information, such as type of activity (e.g., transaction, viewing/browsing, reviewing, sharing, adding items to a wish list or registry, etc.), item information (e.g., category, description, price, etc.), network address, date of activity, duration of activity, etc. The activity log may include entries or records documenting activities performed by users at the current and/or other desired network sites (e.g., advertiser sites, other network sites employing site module 116, etc.).

Security or authentication of the user may be required for one or more of the desired interactions. Site module 116 monitors user interactions on the network or web site, and identifies initiation of an interaction (e.g., a login page, a payment section of a network site, recovery of a username or password or other information, resetting of a password, etc.) requiring authentication of the user at step 205. The site module may monitor and identify the interactions requiring user authentication by examining or intercepting communications between the network or web site of server system 110 and browser/interface module 122 of client system 114 (e.g., communications with requests for purchase, payment, password, etc.).

Once the interaction requiring user authentication is identified, site module 116 suspends performance of the identified interaction, and enables authentication module 120 to authenticate the user. Alternatively, site module 116 may include a security mechanism to provide one or more inquiries to the user to authenticate the user prior to enabling authentication module 120. These inquiries typically request the user to provide basic user information (e.g., pre-defined security questions, birth date, etc.). In this case, once site module 116 verifies the user based on user responses to the one or more inquiries, authentication module 120 may be enabled to provide additional security or authentication as described below.

Authentication module 120 initially queries the activity log in database system 118 at step 210 to determine an activity history for the user (e.g., indicating prior activities performed by the user, etc.). The activity log may include entries or records documenting activities performed by users at the current and/or other desired network sites as described above. For example, the entries may include information (e.g., price, date, activity, item description and/or other information, etc.) pertaining to items (e.g., goods, services, etc.) that were purchased, viewed, accessed, or shared, etc. The entries of the activity log are each preferably associated with a user identifier (e.g., username, email address, etc.) in order to identify activities of different users. The query may utilize a user identifier submitted to the network site for access (e.g., username, email address, etc.) in order to obtain the activity history for the user from the activity log.

Authentication module 120 determines an inquiry or question for the user in order to authenticate the user at step 215. The inquiry is based on activity information that preferably includes the activity history for the user. However, the activity information may include any desired information (e.g., user related or other information alone, or in combination with the activity history) to determine the inquiry. For example, the inquiry may be item specific, such as requesting: one or more of the most recent items that the user purchased from the network or web site; one or more of the most recent items that the user has viewed from the network or web site; one or more of the most recent items that the user has added to a wish list or registry; the most expensive item that the user has purchased; items that are compatible with an item the user has purchased (e.g., a corresponding video game in the case where a user purchased a gaming console, coffee pods in the case where a user has purchased a coffee maker, etc.); one or more items reviewed by the user; one or more items shared by the user, etc. Additional inquiries may be utilized pertaining to user related information (e.g., birth date, pre-defined questions, current and/or prior residence addresses, etc.) to provide enhanced authentication.

Thus, the inquiry is dynamically generated (and updated) for each user as the activity history for that user changes over time. This enables the inquiry (and corresponding answer) to continually and dynamically adjust for each different user to provide enhanced authentication.

Authentication module 120 may employ various techniques to determine the inquiry for the user. For example, the authentication module may be configured with a set of inquires with each inquiry of the inquiry set associated with a corresponding set of criteria or conditions (e.g., age of a purchase, quantity of particular items purchased, quantity of accesses/views for items, etc.) at step 220. The criteria basically enable selection of an appropriate inquiry where sufficient information exists in the activity information to enable determination of an answer for that inquiry. In addition, each inquiry may be associated with a set of search parameters (e.g., dates, items, relationships, etc.) to enable determination of a correct reply to the inquiry from the activity information.

The criteria for the set of inquiries is compared to the activity information for the user, where the inquiry with the maximum amount of criteria satisfied by the activity information is selected for user authentication. Alternatively, the criteria for each inquiry may be weighted, where the weights of criteria satisfied by the activity information are combined (e.g., summed, etc.) to produce a score for each inquiry. The inquiry with the highest score may be selected for user authentication. This enables certain criteria to have greater importance or impact on the selection of the inquiry.

Further, priorities may be assigned to each of the inquiries within the inquiry set at step 225. In this case, the criteria for the set of inquiries is compared to the activity information for the user. The inquiry with the highest priority and having a threshold quantity of criteria satisfied by the activity information is selected for user authentication. The threshold quantity may be configurable and set to any desired values (e.g., a specific quantity of criteria, a percentage of criteria, etc.).

Authentication module 120 may further employ machine learning at step 230 to dynamically determine the inquiry for user authentication. In this case, the set of inquiries, corresponding criteria, training data pertaining to activity information, and parameters (of acceptable situations) for selecting individual inquiries may be stored. This information may be updated and processed to train one or more learning models to learn appropriate inquiries as user activities change over time. Authentication module 120 may employ various models to perform the learning (e.g., neural networks, mathematical/statistical models, classifiers, etc.).

Once the inquiry for user authentication is determined, authentication module 120 determines a correct reply to the determined inquiry at step 235. Each inquiry is preferably in the form of a multiple choice question and associated with a plurality of candidate responses selectable by the user. Any quantity or combination of the plurality of candidate responses may be considered to be a correct reply to the inquiry. The quantity of candidate responses for an inquiry may be configurable, and may be set to any desired value. Similarly, the quantity of candidate responses corresponding to a correct reply for an inquiry may be configurable, and set to any desired value. However, the total quantity of candidate responses for an inquiry is preferably set to be greater than the quantity of candidate responses representing the correct reply to increase the possible options for the multiple choice inquiry. This enables information of user interest (e.g., advertisement, etc.) to be incorporated into remaining candidate responses (other than those of the correct reply) as described below. In order to maximize this information, an inquiry may not include a correct reply in the candidate responses, thereby enabling each candidate response to provide information of user interest (e.g., advertisement, etc.).

Initially, authentication module 120 utilizes search parameters associated with the determined inquiry to obtain the correct reply to the determined inquiry from the activity information (e.g., items most recently purchased/viewed, most expensive item purchased, etc.). Alternatively, natural language processing or other techniques may be applied to the determined inquiry to generate search parameters to search the activity information for the correct reply. The correct reply to the determined inquiry may include one or more items (e.g., goods, services, etc.), where each item is assigned to a corresponding candidate response. When the quantity of items of the correct reply exceeds the quantity of candidate responses reserved for the correct reply, the corresponding quantity of items for the reserved candidate responses may be selected utilizing any desired techniques. For example, random selection of the items may be performed, items may be selected based on relationships to other items for remaining candidate responses, etc. The relationships may include relationships to advertiser items, relationships to items desired to be advertised in the remaining candidate responses, etc.

In addition, an embodiment may provide no correct reply to the determined inquiry to enable each candidate response to provide information of user interest, such as an advertisement. In this case, submission of a reply without user selection of a candidate response indicates a correct reply to the determined inquiry.

Authentication module 120 determines the remaining (or incorrect) candidate responses for the determined inquiry for user selection at step 240. The total quantity of candidate responses for an inquiry is preferably set to be greater than the quantity of candidate responses representing the correct reply as described above to increase the possible options for the multiple choice inquiry. The remaining (or incorrect) candidate responses (e.g., candidate responses other than those of the correct reply to the determined inquiry) may provide information associated with other items (e.g., goods, services, etc.). For example, the incorrect candidate responses may be in the form of, or include, advertisements for corresponding items, where the inclusion of these items (or advertisements) in the inquiry may be provided or sold to advertisers for a fee in order to increase revenue of the network site provider and provide brand/product awareness for the advertisers to customers. The advertisements may include an indication of an item and/or any information pertaining to that item (e.g., item description, price, sales/discounts, etc.).

By way of example, the corresponding items associated with the incorrect candidate responses may be selected based on: items that closely fit to the user's known consumer target/segmentation; products the user has previously viewed; products the user has previously purchased; products the user has previously added to a wish or other list; a highest advertising bidder (e.g., when the items are not sold by the merchant); current relevant sales driven recommendations, such as pushing inventory; and/or items that complement items that are purchased or viewed. The complementary items may be determined based on any conventional or other product recommendation techniques (e.g., natural language processing and comparison of item descriptions, purchase history of items, etc.).

Authentication module 120 may employ various techniques to determine the items for the incorrect candidate responses. For example, one or more sets of preferences may be configurable and stored in database system 118. Each preference set includes one or more preferences (e.g., consumer segment, advertiser items, sales recommendations, complementary items, etc.) for selecting items for the incorrect candidate responses. The preferences each indicate corresponding criteria or attributes for items to satisfy that preference (e.g., a segment type of an item of the correct reply, a candidate item of a certain advertiser, etc.). By way of example, the preference sets may include: a set of preferences for selecting items of a specific advertiser related to/complementary of items of the correct reply, a set of preferences for selecting items overstocked in inventory of the site provider or a specific advertiser, etc. Further, a list of advertisers and corresponding information (e.g., company information, item information, links to network or web sites, etc.) may be stored in database system 118 as described above.

The attributes of items associated with the correct reply (e.g., segment, type, item description, etc.) are used to identify candidate items satisfying criteria of the preferences of the preference sets at step 245. Basically, candidate item information including attributes of candidate items (e.g., obtained from the network site, network sites of the advertisers, and/or provided item and/or advertiser information, etc.) are compared to the attributes of items associated with the correct reply in accordance with preference set criteria to determine for each preference set the candidate items satisfying the criteria of that preference set. The preference sets (and candidate items) may be selected in various manners to provide a quantity of candidate items corresponding to the remaining number of candidate responses. For example, preference sets may be selected in random order until attaining the appropriate quantity of candidate items, the preference sets with the most/least candidate items sets may be selected until attaining the appropriate quantity of candidate items, etc. The corresponding candidate items of the selected preference sets are assigned to the remaining candidate responses.

Alternatively, the preference sets may be weighted, where the weights of preference sets providing the appropriate quantity of candidate items are utilized to produce a score. For example, when a single preference set provides the appropriate quantity of candidate items, the score may be assigned the weight of that preference set. When a plurality of preference sets in combination provide the appropriate quantity of candidate items, the weights of those preference sets may be combined (e.g., summed, etc.) to produce the score. The preference set, or preference set combination, producing the highest score may be selected, where the corresponding candidate items are assigned to the remaining candidate responses. This enables certain preference sets (e.g., highest paying advertiser, overstocked inventory, etc.) to have greater importance or impact on the selection of the candidate items for the determined inquiry.

Further, priorities may be assigned to each preference set at step 250. In this case, candidate item information including attributes of candidate items (e.g., obtained from the network site, network sites of the advertisers, and/or provided item and/or advertiser information, etc.) are compared to the attributes of items associated with the correct reply in accordance with preference set criteria to determine for each preference set the candidate items satisfying the criteria for that preference set. The preference sets are selected in highest priority order until attaining the appropriate quantity of candidate items. The corresponding candidate items of the selected preference sets are assigned to the remaining candidate responses.

Authentication module 120 may further employ machine learning at step 255 to dynamically determine the items for the incorrect candidate responses. In this case, preference information and training data pertaining to item information, activity history information, candidate item information, preference sets, and parameters (of acceptable situations) for selecting candidate items may be stored. This information may be updated and processed to train one or more learning models to learn appropriate candidate items as user activities change over time. Authentication module 120 may employ various models to perform the learning (e.g., neural networks, mathematical/statistical models, classifiers, etc.).

Further, machine learning and/or rules may be employed to control items for candidate responses. For example, prior authentications may be analyzed to learn user interest for items of the candidate responses. When a user does not select an item of a candidate response in a prior authentication, this may indicate a lack of interest and the item may be omitted for a quantity of future authentications. By way of example, during a second authentication of the user, an item from a first authentication of the user may be omitted when that item was not selected by the user. This may be learned based on machine learning models, or rules may be provided to control selection of items for candidate responses.

The selected candidate items are assigned to the incorrect candidate responses as described above. One or more of the candidate responses of the determined inquiry (e.g., correct and incorrect candidate responses) may include a link to provide information pertaining to the associated item, or to perform an activity (e.g., purchase the item, etc.). Further, each of the candidate responses (e.g., correct and incorrect candidate responses) may include any information of user interest (e.g., sales, discounts, actuator to initiate an activity pertaining to the associated item, events, topics, etc.). Advertisements may include an indication of an item and/or any information pertaining to that item (e.g., item description, price, sales/discounts, actuator to initiate an activity pertaining to the associated item etc.).

Authentication module 120 presents the determined inquiry and corresponding candidate responses to the user on an interface (e.g., interface 322 of FIG. 3) of client system 114 at step 260. The interface may also provide a date for the activity (e.g., purchasing or viewing of the associated item, etc.) to assist the user in recalling an answer to the presented inquiry.

The user responds to the presented inquiry by selecting (e.g., via a mouse or other input device, etc.) zero or more of the candidate responses of the interface on client system 114. Authentication module 120 may request the user to provide further details for the candidate responses. For example, the authentication module may consider color/size variation and other factors of the items associated with the candidate responses, and request the user to provide correct replies to those factors. These factors may be ascertained from the activity information.

In addition, the user may select or actuate (e.g., via a mouse or other input device, etc.) the links of any of the candidate responses to obtain more information about the items associated with those responses. This provides potential up-sell and/or cross-sell opportunities for items (e.g., goods, services, etc.) that the user has not yet purchased or are related to items the user has purchased.

Authentication module 120 receives the user selection (and any replies to the factors) from client system 114, and verifies the user (e.g., compares the user selection (and any replies to the factors) to the correct reply to the inquiry). When the correct reply to the presented inquiry is received as determined at step 265, the authentication module directs site module 116 to enable or resume performance of the suspended interaction at step 270. In addition, the site module may present links to items of the incorrect candidate responses of the presented inquiry in order to allow the user to obtain more information about those items or conduct a purchase or other transaction.

After performance of the interaction at step 270 or, when the user reply (e.g., user selection and any replies to the factors) does not represent the correct reply as determined at step 265, site module 116 determines the presence of further interactions requested by the user at step 275. When further interactions are requested, the above process is repeated from step 205 until no further interactions are desired by the user.

Figure 3:
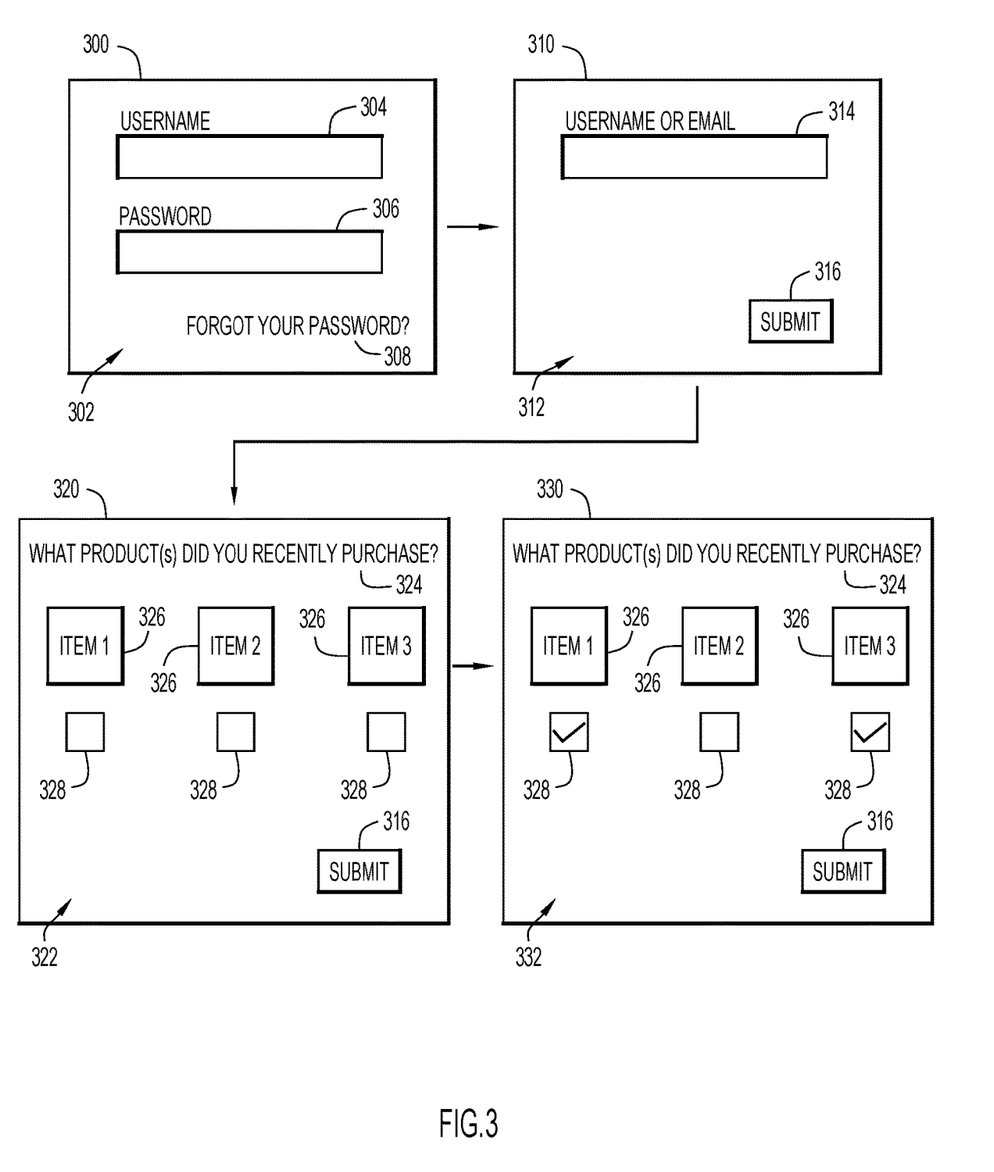
FIG. 3 is a diagrammatic illustration of authenticating a user with a user activity based inquiry according to an embodiment of the present invention.

An example scenario of authenticating a user according to an embodiment of the present invention is illustrated in FIG. 3. Initially, a user on a client system 114 navigates via browser/interface module 122 to a desired network or web site to perform various interactions (e.g., conduct purchases, pay bills, or other transactions, banking, access data, review items, share items, add items to a wish list or registry, etc.) at flow 300. Site module 116 controls performance of the corresponding desired interactions of the network site. The site module presents a graphical user interface 302 including a field 304 for a username, and a field 306 for a password. Interface 302 further includes an actuator 308 (e.g., "Forgot your password?" as viewed in FIG. 3) to initiate a process to recover a password. However, present invention embodiments may be employed for any interactions requiring user authentication.

The user actuates actuator 308 to recover the password, and site module 116 presents a graphical user interface 312 to the user on client system 114 at flow 310. Interface 312 includes a field 314 for a username or email address, and a button 316 (e.g., "Submit" as viewed in FIG. 3) to submit the username or email address provided in field 314.

When the user enters a username or email address in field 314 and actuates button 316 from client system 114, site module 116 enables authentication module 120 to authenticate the user prior to recovery of the password. The authentication module presents a graphical user interface 322 to the user on client system 114 at flow 320. Interface 322 presents an inquiry 324 and candidate responses 326 determined as described above based on activity information of the user. For example, inquiry 324 may pertain to recent products purchased by the user (e.g., "What product(s) did you recently purchase?" as viewed in FIG. 3), while candidate responses 326 may each indicate a corresponding product (e.g., "Item 1", "Item 2", and "Item 3" as viewed in FIG. 3). The candidate responses may each include a link to enable the user to obtain more information about that product and/or conduct a purchase or other transaction. This gives an ability to present information of user interest and/or advertise other products (e.g., up-sell or cross-sell) during the authentication process as described above.

The user may select zero or more candidate responses 326 on interface 320 in reply to inquiry 324. Each candidate response 326 is associated with a selection field 328 to enable selection of that candidate response. When the user selects a candidate response by actuating the corresponding selection field, an updated graphical user interface 332 is presented to the user on client system 114 at flow 330. By way of example, selection fields 334 may display a check mark to indicate selection of a candidate response, but any suitable indicator may be utilized. In this example, the user has selected items 1 and 3 as a reply to the inquiry (e.g., items recently purchased by the user). The user actuates button 316 to submit the reply for verification. If the reply is incorrect as determined by authentication module 120, a new inquiry may be determined and presented for evaluation by the user.

When the reply is verified as correct by authentication module 120, site module 116 enables the password to be recovered by the user. In addition, a link to the incorrect candidate response (e.g., item 2) may be provided upon the user gaining access to the network site with the recovered password in order to obtain information about that product and/or conduct a purchase or other transaction.

It will be appreciated that the embodiments described above and illustrated in the drawings represent only a few of the many ways of implementing embodiments for user authentication employing user activity based inquiries.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser/interface software, communications software, server software, site module, authentication module, etc.). These systems may include any types of monitors and input devices (e.g., keyboard, mouse, voice recognition, etc.) to enter and/or view information.

It is to be understood that the software (e.g., site module, authentication module, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., site module, authentication module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store any desired information (e.g., weights, preferences, priorities, rules, activity log, item information, etc.). The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., candidate responses, inquiry, user reply, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user.

The present invention embodiments are not limited to the specific tasks or algorithms described above, but may be utilized for any interaction to authenticate any user. The present invention embodiments may be applied to any interaction where user authentication is desired or required (e.g., to conduct any transaction, gain access to any network or other site, gain access to data, recover any information, etc.). The activity log may maintain any desired activities and associated information for any quantity of users.

The inquiry for user authentication may be determined based on any individual or combination of desired criteria or factors. The weights for determining the inquiry may be assigned in any fashion, and have any desired values. The priorities for determining the inquiry may be assigned in any fashion, and have any desired values. The machine learning may be utilized to learn any desired preferences for identifying an inquiry.

An inquiry for user authentication may be associated with any quantity of candidate responses, where any quantity or combination of the candidate responses (e.g., zero or more, etc.) may represent a correct reply to the inquiry. The inquiry is preferably a multiple-choice type question, but may be any type of question. Further, various types of questions may be combined to form the inquiry (e.g., multiple-choice in combination with receiving direct answers to questions from users, etc.).

The candidate responses may each be associated with one or more items. The items may be any good, service, or other item for consumer or business consumption (e.g., purchase, lease, rent, etc.). The remaining candidate responses (other than those representing the correct reply) may be determined based on any individual or combination of desired criteria or factors. The weights for determining the remaining candidate responses may be assigned in any fashion, and have any desired values. The priorities for determining the remaining candidate responses may be assigned in any fashion, and have any desired values. The machine learning may be utilized to learn any desired preferences for identifying items for the remaining candidate responses.

The candidate responses may include any desired information. Further, an advertisement may include a link to information pertaining to the corresponding item, and/or an actuator to initiate an activity (e.g., to purchase an item, etc.). The linked information may reside in or on any suitable structure (e.g., repository, network or web page, directory/file structure, etc.).

The identified interaction may be suspended and resumed in any desired manner. Further, upon completion of the suspended and enabled interaction, information pertaining to the candidate responses may be presented for further viewing and/or interaction (e.g., conduct a transaction, etc.).

When the quantity of identified items for the candidate responses (e.g., correct and incorrect reply) exceeds the quantity of candidate responses for an inquiry, the corresponding quantities of items may be selected utilizing any desired techniques. For example, random selection of the items may be performed, items may be selected based on relationships to other items, etc. In addition, any quantity of any desired further details for the candidate responses may be requested. For example, the further details may include color, size, or other characteristic of an item, recency of purchase, recency of viewing, etc. These details in combination with the user selection may form a user reply to the inquiry for verification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of authenticating a user comprising:
    monitoring, via a processor, interactions on a network site and identifying an interaction requiring user authentication;
    generating, via the processor, an inquiry to authenticate the user based on an activity history for the user;
    determining, via the processor, a plurality of candidate responses for the inquiry, wherein the plurality of candidate responses includes at least one first candidate response representing a correct reply to the inquiry and at least one second candidate response representing an incorrect reply to the inquiry, wherein each first candidate response includes information for a corresponding item associated with the activity history for the user and each second candidate response includes information for a corresponding item of a specific advertiser, and wherein determining a plurality of candidate responses for the inquiry comprises:
        assigning a corresponding priority to one or more sets of preferences indicating attributes for selecting items of the specific advertiser for the at least one second candidate response;
        comparing attributes of the corresponding item of each first candidate response to the attributes of the one or more sets of preferences; and
        determining a corresponding item from the specific advertiser for each second candidate response based on results of the comparing and the corresponding priority of the one or more sets of preferences;
    presenting, via the processor, the inquiry to the user and enabling user selection of one or more of the plurality of candidate responses as a reply to the inquiry; and
    performing, via the processor, the identified interaction in response to verification of the reply to the inquiry authenticating the user.

2. The computer-implemented method of claim 1, wherein the identified interaction includes one or more from a group of a login, a payment, resetting a password, recovering a username, and recovering a password.

3. The computer-implemented method of claim 1, wherein the activity history includes one or more from a group of viewing and purchasing one or more products, and the inquiry pertains to the plurality of candidate responses.

4. The computer-implemented method of claim 3, wherein the plurality of candidate responses includes an advertisement, and the corresponding item for each second candidate response is determined based on one or more from a group of products within a consumer segment of the user, products the user has previously viewed, products the user has previously purchased, products the user has previously added to a list, products of a highest paying merchant for the advertisement, product inventory, and products complementing the one or more products of the inquiry.

5. The computer-implemented method of claim 1, wherein each of the first and second candidate responses includes a link to information pertaining to the corresponding item.

6. The computer-implemented method of claim 1, further comprising:
    presenting information pertaining to corresponding items of the first and second candidate responses in response to performing the identified interaction.

7. The computer-implemented method of claim 1, wherein determining a plurality of candidate responses for the inquiry further comprises:
    learning, via the processor, candidate responses to the inquiry based on applying the activity history to a machine learning model.

8. The computer-implemented method of claim 1, wherein determining a plurality of candidate responses for the inquiry further comprises:
    omitting an item for a candidate response to the inquiry when the item appeared in a prior authentication of the user without receiving interaction from the user.

9. A system for authenticating a user comprising:
    at least one processor configured to:
        monitor interactions on a network site and identify an interaction requiring user authentication;
        generate an inquiry to authenticate the user based on an activity history for the user;
        determine a plurality of candidate responses for the inquiry, wherein the plurality of candidate responses includes at least one first candidate response representing a correct reply to the inquiry and at least one second candidate response representing an incorrect reply to the inquiry, wherein each first candidate response includes information for a corresponding item associated with the activity history for the user and each second candidate response includes information for a corresponding item of a specific advertiser, and wherein determining a plurality of candidate responses for the inquiry comprises:
            assigning a corresponding priority to one or more sets of preferences indicating attributes for selecting items of the specific advertiser for the at least one second candidate response;
            comparing attributes of the corresponding item of each first candidate response to the attributes of the one or more sets of preferences; and
            determining a corresponding item from the specific advertiser for each second candidate response based on results of the comparing and the corresponding priority of the one or more sets of preferences;

present the inquiry to the user and enable user selection of one or more of the plurality of candidate responses as a reply to the inquiry; and perform the identified interaction in response to verification of the reply to the inquiry authenticating the user.

10. The system of claim 9, wherein the identified interaction includes one or more from a group of a login, a payment, resetting a password, recovering a username, and recovering a password;

wherein the activity history includes one or more from a group of viewing and purchasing one or more products, and the inquiry pertains to the plurality of candidate responses;

wherein the plurality of candidate responses includes an advertisement, and the corresponding item for each second candidate response is determined based on one or more from a group of products within a consumer segment of the user, products the user has previously viewed, products the user has previously purchased, products the user has previously added to a list, products of a highest paying merchant for the advertisement, product inventory, and products complementing the one or more products of the inquiry; and wherein each of the first and second candidate responses includes a link to information pertaining to the corresponding item.

11. The system of claim 9, wherein the at least one processor is further configured to:

present information pertaining to corresponding items of the first and second candidate responses in response to performing the identified interaction.

12. The system of claim 9, wherein determining a plurality of candidate responses for the inquiry further comprises:

learning candidate responses to the inquiry based on applying the activity history to a machine learning model.

13. A computer program product for authenticating a user, the computer program product comprising one or more computer readable storage media collectively having program instructions embodied therewith, the program instructions executable by a processor to cause the processor to:

monitor interactions on a network site and identify an interaction requiring user authentication;

generate an inquiry to authenticate the user based on an activity history for the user;

determine a plurality of candidate responses for the inquiry, wherein the plurality of candidate responses includes at least one first candidate response representing a correct reply to the inquiry and at least one second candidate response representing an incorrect reply to the inquiry, wherein each first candidate response includes information for a corresponding item associated with the activity history for the user and each second candidate response includes information for a corresponding item of a specific advertiser, and wherein determining a plurality of candidate responses for the inquiry comprises:

assigning a corresponding priority to one or more sets of preferences indicating attributes for selecting items of the specific advertiser for the at least one second candidate response;

comparing attributes of the corresponding item of each first candidate response to the attributes of the one or more sets of preferences; and determining a corresponding item from the specific advertiser for each second candidate response based on results of the comparing and the corresponding priority of the one or more sets of preferences;

present the inquiry to the user and enable user selection of one or more of the plurality of candidate responses as a reply to the inquiry; and perform the identified interaction in response to verification of the reply to the inquiry authenticating the user.

14. The computer program product of claim 13, wherein the identified interaction includes one or more from a group of a login, a payment, resetting a password, recovering a username, and recovering a password.

15. The computer program product of claim 13, wherein the activity history includes one or more from a group of viewing and purchasing one or more products, and the inquiry pertains to the plurality of candidate responses.

16. The computer program product of claim 15, wherein the plurality of candidate responses includes an advertisement, and the corresponding item for each second candidate response is determined based on one or more from a group of products within a consumer segment of the user, products the user has previously viewed, products the user has previously purchased, products the user has previously added to a list, products of a highest paying merchant for the advertisement, product inventory, and products complementing the one or more products of the inquiry.

17. The computer program product of claim 13, wherein each of the first and second candidate responses includes a link to information pertaining to the corresponding item.

18. The computer program product of claim 13, wherein the program instructions further cause the processor to:

present information pertaining to corresponding items of the first and second candidate responses in response to performing the identified interaction.

19. The computer program product of claim 13, wherein determining a plurality of candidate responses for the inquiry further comprises:

learning candidate responses to the inquiry based on applying the activity history to a machine learning model.

20. The computer program product of claim 13, wherein determining a plurality of candidate responses for the inquiry further comprises:

omitting an item for a candidate response to the inquiry when the item appeared in a prior authentication of the user without receiving interaction from the user.

* * * * *